(12) United States Patent
Zhao

(10) Patent No.: US 9,754,310 B2
(45) Date of Patent: Sep. 5, 2017

(54) LOCATION BASED SHOPPING LIST

(71) Applicant: PAYPAL, INC., San Jose, CA (US)

(72) Inventor: Lucy Ma Zhao, Austin, TX (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 14/323,448

(22) Filed: Jul. 3, 2014

(65) Prior Publication Data

US 2014/0316938 A1 Oct. 23, 2014

Related U.S. Application Data

(63) Continuation of application No. 13/477,811, filed on May 22, 2012.

(51) Int. Cl.
*G06Q 30/06* (2012.01)
*G06Q 30/02* (2012.01)
*H04W 4/02* (2009.01)

(52) U.S. Cl.
CPC ..... *G06Q 30/0633* (2013.01); *G06Q 30/0207* (2013.01); *G06Q 30/0241* (2013.01); *G06Q 30/06* (2013.01); *H04W 4/021* (2013.01)

(58) Field of Classification Search
CPC ............... G06Q 30/02; G06Q 30/0255; G06Q 30/0259; G06Q 30/0261; G06Q 30/0633
USPC ................................................ 705/26.1, 26.8
See application file for complete search history.

(56) References Cited

U.S. PATENT DOCUMENTS

| 8,600,835 | B1* | 12/2013 | Lueck | ........................ 705/26.8 |
| 2007/0290037 | A1* | 12/2007 | Arellanes et al. | ............ 235/383 |
| 2011/0112904 | A1* | 5/2011 | Stupp | ........................ 705/14.58 |
| 2013/0013404 | A1* | 1/2013 | Suprock et al. | ........... 705/14.53 |

* cited by examiner

*Primary Examiner* — Mila Airapetian
(74) *Attorney, Agent, or Firm* — Haynes and Boone, LLP

(57) ABSTRACT

A user can obtain a list of products previously purchased at a store where the user is presently shopping via the user's mobile device. The user can use this list to determine if any of the products previously purchased should again be purchased on the present shopping trip. For example, the user can choose from an app on the mobile device to view products purchased by location. A location based shopping list system can then determine at which store the user is shopping based upon a GPS location provided by the user's mobile device. The location based shopping list system can then return the list of product previously purchased at that store.

20 Claims, 3 Drawing Sheets

LOCATION BASED SHOPPING LIST

CROSS REFERENCE

This application is a continuation patent application of U.S. patent application Ser. No. 13/477,811 filed on May 22, 2012, the complete disclosure of which is herein incorporated by reference in its entirety.

BACKGROUND

Technical Field

The present disclosure generally relates to electronic commerce and, more particularly, relates to a method and system for providing a user with a previous shopping list that was used at a location where the user is presently shopping.

Related Art

Shopping lists are commonly used by consumers when shopping. Shopping lists help to assure that a consumer purchases all of the products that the consumer needs to purchase during a trip to a store.

However, a consumer will occasionally be shopping at a store and remember that an additional product should be purchased, but cannot remember what the product is. This can occur even if the user has a shopping list for this particular trip to the store.

On some occasions, it would be helpful to the consumer to have a previous shopping list for the same store. The consumer may know that the forgotten product was purchased during the last visit to the store, even thought the consumer cannot remember what the product is. For example, the previous shopping list may have toothpaste on it. When the consumer sees that toothpaste is on the previous shopping list, the consumer may remember that the store was out of the consumer's brand of toothpaste on the last visit and that the consumer still needs to purchase toothpaste.

It can also be helpful to have the last shopping list for the same store when the product was purchased during the last visit to the store. The last shopping list would be helpful when the consumer does not want to purchase the product again if the product has already been purchased recently. For example, the consumer may not remember whether or not laundry soap has been purchased recently and may not want to purchase laundry soap again if it has already been purchased recently.

SUMMARY

According to an embodiment, methods and systems are disclosed for providing a list of products previously purchased by a user. For example, a user can obtain a list of products previously purchased at a store where the user is presently shopping via the user's mobile device. The user can use this list to determine if any of the products previously purchased should again be purchased on the present shopping trip. An app on a mobile device can be used to request, retrieve, and view the list.

According to an embodiment, a location based shopping list system can comprise a memory storing account information for a user. The account information can include a list of shopping locations for the user and a list of products previously purchased at each of the shopping locations. A processor can be operable to receive a communication from the user. The communication can include information representative of a present shopping location of the user and can also include a request for a list of products previously purchased at the present shopping location. The processor and the memory can be part of a payment server.

The processor can further be operable to access an account of the user, such as in the memory, find the present shopping location on the list of shopping locations, retrieve the list of products previously purchased at the present shopping location, and send the list of products previously purchased at the present shopping location to the user. Thus, the user can obtain a list of previously purchased products and can use the list to determine if any of the previously purchased products should be purchased on the present visit to the store.

According to an embodiment, the list of products previously purchased at each of the shopping locations can comprise a list of products previously purchased during the last visit by the user to each of the shopping locations. The list of products previously purchased at each of the shopping locations can comprise a more complete or extended history of products previously purchased during a plurality of visits by the user to each of the shopping locations. For example, the list of products previously purchased at each of the shopping locations can comprise all of the products purchased by the user at each of the shopping locations (as least since employing the location based shopping list system disclosed herein).

For example, the list of products previously purchased can be presented with the most recently purchased products at the top and earlier purchased products below, i.e., in reverse chronological order. The user can scroll down through the list. For example, the user can scroll down through the list to find the last time that paper towels were purchased.

According to an embodiment, the information representative of the present shopping location can be representative of a present location of the user. The information representative of the present shopping location can be a GPS location of a mobile device of the user and the processor can determine a shopping location from the GPS location.

According to an embodiment, the request for the list of products previously purchased at the present shopping location can be a request for a list of products of a specified type. For example, the request for a list of products can be a request for a list of food products only. As a further example, the request for a list of products can be a request for a list of toiletries only.

According to an embodiment, the processor can be operative to retrieve lists of products previously purchased at locations other than the present shopping location and can return the lists of products previously purchased at locations other than the present shopping location to the user. For example, the processor can be operative to retrieve lists of products purchased at all stores within the city limits and can return such lists to the user. As a further example, the processor can be operative to retrieve lists of products purchased only at grocery stores within the city limits and can return such lists to the user.

Thus, users can more conveniently determine which products should be purchased during a visit to a store. Forgotten products and undesirable repeat visit to the store can be avoided.

DETAILED DESCRIPTION

According to one or more embodiments of the present invention, a user can obtain a list of products previously purchased at a store where the user is presently shopping via the user's mobile device. The user can use this list to help determine what products should be purchased on the present shopping trip. The list can be useful to determine what products should be purchased and can be useful to determine what products do not need to be purchased The list can remind the user of a product that was purchased before and needs to be purchased again. For, example, the user can see that hand soap is on the list of products purchased on the last visit to the store and can realize that insufficient hand soap remains at home and therefore should be purchased again.

The list can remind the user that a product was purchased before and does not need to be purchased again. For, example, the user can see that toothpaste was purchased on the last visit to the store and can realize that sufficient toothpaste remains at home such that toothpaste does not need to be purchased again.

According to an embodiment, the user can choose from an app on the mobile device to view products previously purchased by the user. The user can select an option listed on the app as "Purchase by Location" and can further select "Current Location" to view only those products purchased from the store where the user is currently shopping. The user can thus view only those products purchased at the store where the user is presently shopping. The location based shopping list system can then determine at which store the user is currently shopping based upon a GPS location provided by the user's mobile device. The location based shopping list system can then return the list of products previously purchased at that store, including date purchased, price, and any other desirable information, to the user's mobile device for viewing by the user.

According to an embodiment, the user can pay for purchases with a payment provider account, a credit card account, a debit card account, a gift card account, or the like. A payment server can store in a memory a list of products purchased during each visit by the user to the store. The lists of products purchased can define the previous shopping lists of the user.

Figure 1:
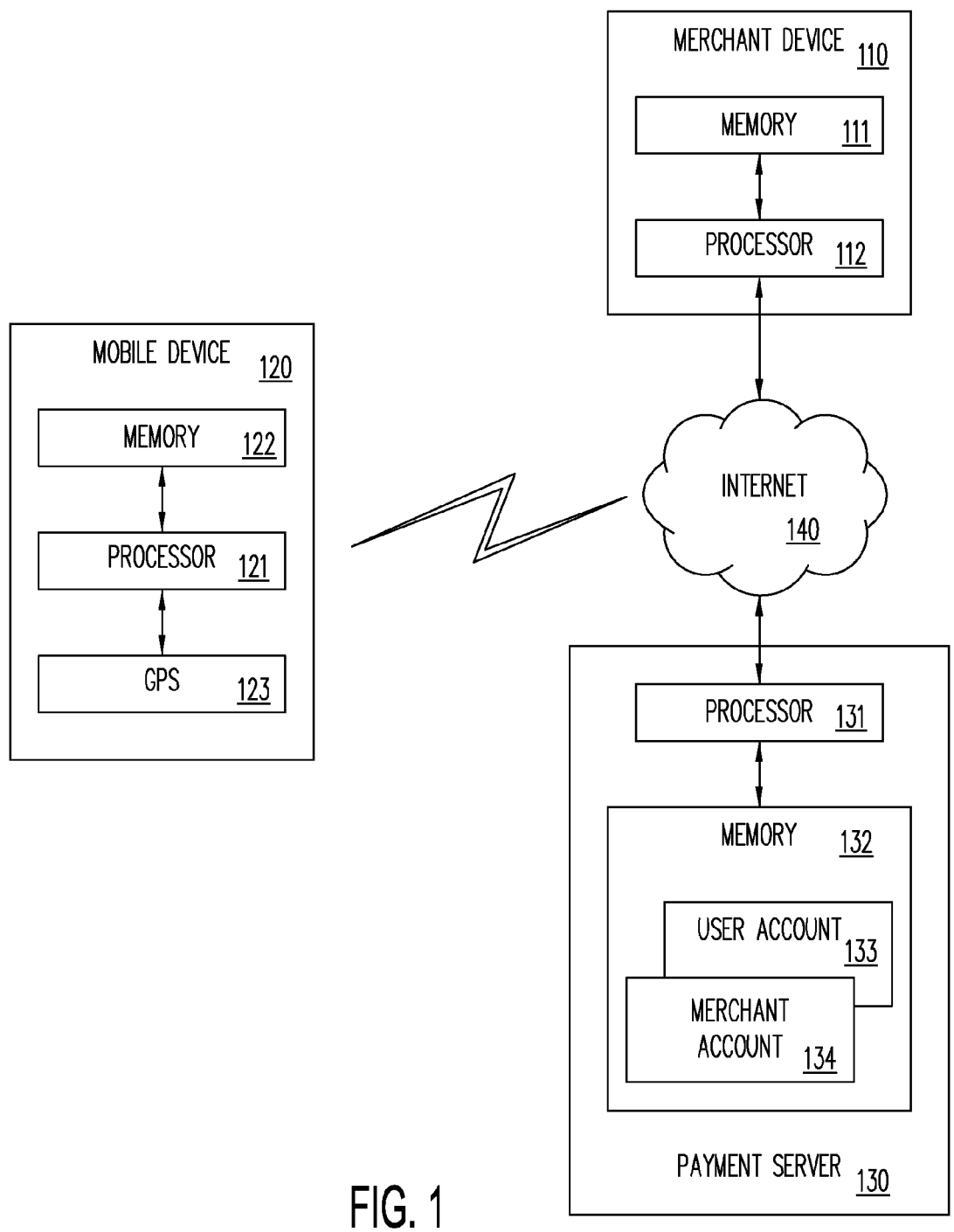
FIG. 1 is a block diagram of a location based shopping list system, in accordance with an embodiment.

FIG. 1 is a block diagram of a location based shopping list system, according to an embodiment. The system can include a merchant device 110. The merchant device 110 can be a merchant checkout terminal, a computer, and/or a server, for example. The merchant device 110 can include a memory 111 and a processor 112.

The system can include a mobile device 120. The mobile device 120 can be carried by the user. The mobile device 120 can be a cellular telephone, a smart telephone, a hand held computer, or a tablet computer, far example. The mobile device can include a processor 121, a memory 122, and a global positioning system (GPS) 123. The memory 122 can store an app for the location based shopping list system and the app can be executable via the processor 121.

The system can include a payment server 130. The payment server can be a server of a payment provider, such as Paypal, Inc. The payment server 130 can be a single server or can be a plurality of servers. The payment server 130 can include a processor 131 and a memory 132. The memory 132 can store a user account 133 and a merchant account 134.

The memory 132 can store a user account 133 for each user that subscribes to the payment server 130. The memory 132 can store a user a merchant account 134 for each merchant that subscribes to the payment server 130.

The processor 131 and the memory 132 can cooperate to provide the user with one or more lists of products that were purchased by the user or by anyone else who participates in the location based shopping list system and is linked to the user. For example, members of the user's family and/or friend of the user can be linked to the user such that their purchases are treated as purchases of the user by the location based shopping list system.

The products can have been purchased from any store and can have been purchased at any time and during any number of visits. Products from multiple stores and/or multiple visits to the same store can be aggregated into a single list. The user can designate what other people and what stores are to be included (for which lists of previously purchased products are to be provided) during a set up process.

The merchant device 110, the mobile device 120, and the payment server 130 can communicate with one another via a network, such as the Internet 140. The merchant device 110, the mobile device 120, and the payment server 130 can communicate with one another via a plurality of networks, such as local area networks (LANs), wide area networks (WANs), cellular telephone networks, and the like.

Figure 2:
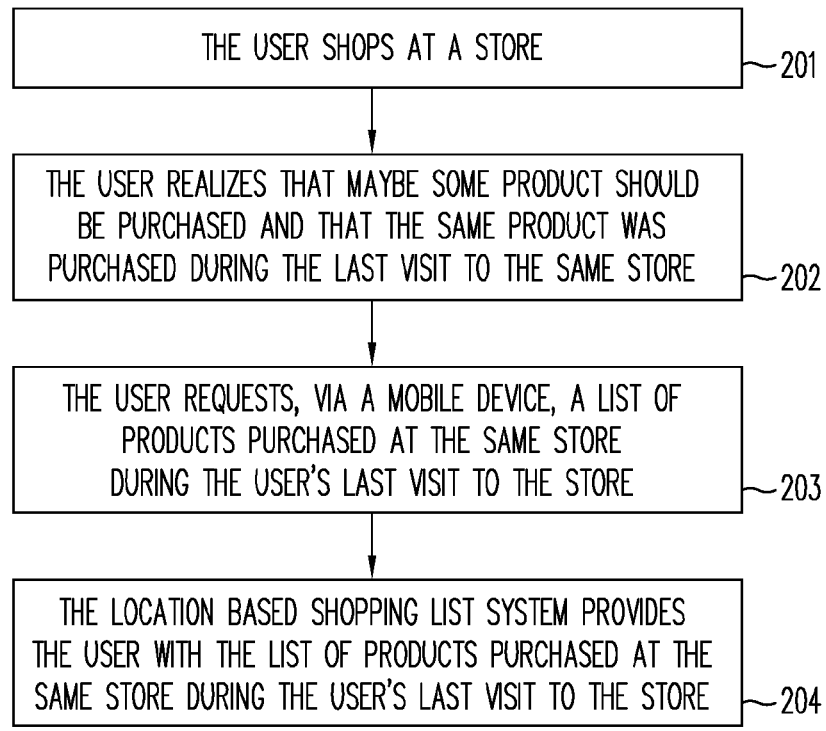
FIG. 2 is a flow chart showing a method for providing location based shopping lists, in accordance with an embodiment.

FIG. 2 is a flow chart showing a method for providing location based shopping lists, in accordance with an embodiment. A user can shop at a store, as shown in step 201. The store can be in the user's neighborhood or outside of the user's neighborhood. The store can be a store where the user frequently shops or can be a store where the user rarely shops. The store can be any store. The store can have the merchant device 110.

The store can use payment services from the payment provider that has the payment server 130. The user can use payment services from the payment provider that has the payment server 130. Both the store and the user can use the same payment provider. Alternatively, the store and the user can use different payment providers. For example, the payment servers 130 of different payment providers can cooperate to provide location based shopping lists.

The user can realize that maybe some product should be purchased at the store and that the same product was purchased during the last visit to the same store, as shown in step 202. The user may be unable to remember what the product is, e.g., may have forgotten which item the product is. However, the user may believe that if the user can view a list of products purchased at the same store during the user's last visit to that store, then the user will recognize the forgotten product and thus remember which product needs to be purchased during the present visit to the store.

The user can request, via the mobile device 120, a list of products purchased at the same store during the user's last visit to the store, as shown in step 203. For example, the user can open an app. The app can be a payment provider app. The user can request the list of products via the app. The user can modify this request to cover other stores, other trips to the store(s), and to qualify the items and/or dates of purchase, as discussed with respect to FIG. 3 below.

The location based shopping list system can provide the user with the list of products purchased at the same store or another branch of the store at a different location during the user's last visit or previous visit(s) to the store or other branch stores, as shown in step 204. For example, the payment server 130 can receive a communication from the mobile device 120. The communication can include a request for the list of the products and can include the GPS location of the mobile device 120.

The payment server 130 can use the GPS location of the mobile device to determine which store the user is presently in. The payment server 130 can compare the GPS location of the mobile device 120 to the GPS locations of stores listed in the user account 134 to determine which store the user is presently in.

If the GPS location of the mobile device 120 is ambiguous (such as due to the mobile device 120 being close to more than one store), then the processor 131 can use statistical information to determine which store the user is in and/or can query the user regarding which store the user is in. For example, if the user is shopping in an ACE Hardware store and there is a Radio Shack next door, the GPS coordinates provided by the mobile device 120 may be inadequate to distinguish between the ACE Hardware store and the Radio Shack. The processor 131 can cooperate with the memory 132 to determine that the user shops at the ACE Hardware store more frequently than at the Radio Shack. Therefore, the processor 131 can use the ACE Hardware store as the user's present location. The processor 131 can optionally confirm the user's present location with the user, such as by asking the user whether the user is currently at Radio Shack or ACE Hardware and receiving a reply from the user on the user device.

The user can review the previous shopping list to refresh the user's memory as to what product or products may need to be purchased during the present trip to the store. Reviewing such a previous location based shopping list may provide other benefits. For example, a shopping list from another store can be retrieved and reviewed. The shopping list from the other store can include prices for the products purchased. Reviewing the shopping list from the other store can facilitate price comparisons.

As a further example, when a shopping list from one store is provided to a shopper at a different store, specials can be advertised for the first store. For example, the user can be shopping at Stater Brothers and can retrieve a previous shopping list from Vons grocery store. The previous shopping list from Vons can include advertisements for current specials at Vons. For example, the payment server 130 that provides a previous shopping list to the user can first query the merchant device 110 for Vons regarding such advertisements and can include the advertisements to the user along with the previous shopping list for Vons.

The previous shopping list from any store, including the store where the user is presently shopping, can be accompanied by announcements, discount coupons, or notifications of discounts. For example, the location based shopping list system can query the present shopping location or a server for the present shopping location for any incentives for the user, such as incentives that are based on one or more previous shopping lists from the same or from a different merchant. These previous shopping lists can be accompanied by any desired information. The information can be specific for the user or can be of a more general nature, e.g., announcements that apply to all shoppers.

The advertisements can be tailored to the shopping habits of the user. For example, if the user is a frequent purchaser of laundry soap, then any specials on laundry soap can be advertised along with the list of previously purchased products.

Figure 3:
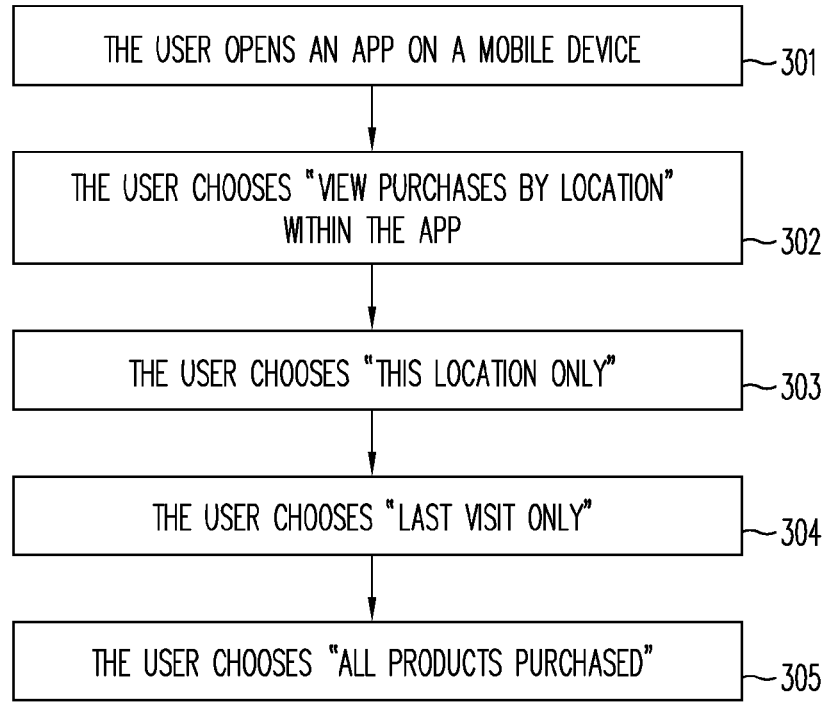
FIG. 3 is a flow chart showing further detail of the method for providing location based shopping lists, in accordance with an embodiment.

FIG. 3 is a flow chart showing further detail of the method for providing location based shopping lists, in accordance with an embodiment. As discussed above, the user can open an app on the mobile device 120, as shown in step 301. The app can be a dedicated app, e.g., an app dedicated solely to providing previous shopping lists. The app can be an app with another purpose. For example, the app can be a payment provider app that has general payment provider functionality, such as viewing balances and transferring funds. The payment provider can be Paypal, Inc., for example.

The user can choose a desired function from a list, e.g., a drop down menu. For example, the user can choose "View Purchases by Location" or "View Purchases by Merchant", as shown in step 302. The user can make such a selection by any desired means.

The user can choose from what locations the user wants to receive shopping lists. For example, the user can choose to receive shopping lists from the location where the shopper is presently shopping by choosing "This Location Only", as shown in step 303. The option "This Location Only" can be chosen from among other options including "All Locations", "All Locations in the Same City" for example.

The user can choose a time frame for the shopping lists. For example, the user can choose to receive shopping lists from the last visit to one or more stores by choosing "Last Visit Only", as shown in step 304. The option "Last Visit Only" can be chosen from among other options including "Last Three Visits", "All Visits This Month", and "All Visits", for example.

The user can choose what products purchased are to be shown on the shopping lists. For example, the user can choose to show all of the products purchased by choosing "All Products Purchased", as shown in step 305. The option "All Products Purchased" can be chosen from among other options including "Food Products", "Non-Food Products", "Hardware", and "Magazines", for example.

Thus, the lists can be filtered. The filter criteria can be pre-set by the user, such as during a setup process. The filter criteria can be specified by the user when the list is requested. The list can be filtered using any useful criteria. For example, the list can be filtered by the name of the store(s), the location of the store(s), the type of the store(s), the name of the products, the type of the products, the purchase of specified multiple products (products purchased together), the date of the purchase, the ranges of dates of the purchases, the person who made the purchase, how the payment was made, or any other criteria. User defined criteria can be used to filter the purchase.

The list can be generated from the user account 133 and/or merchant accounts 134 of stores that the user has visited. The list can be generated by the processor 131 of the payment server 130. The list can be communicated from the payment server 130 to the mobile device 120 via the Internet 140 and can be viewed on the mobile device 120. The list can be communicate from the payment server 130 to the mobile device via any other means, e.g., via the cellular telephone system.

The processor and memory that facilitate operation of the method of FIGS. 2 and 3 can be the processor 131 and memory 132 of the payment server 130. The processor and memory that facilitate operation of the method of FIGS. 2 and 3 can be a processor and memory of a different payment server 130. The processor and memory that facilitate operation of the method of FIGS. 2 and 3 can be any desired processor and memory.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 4:
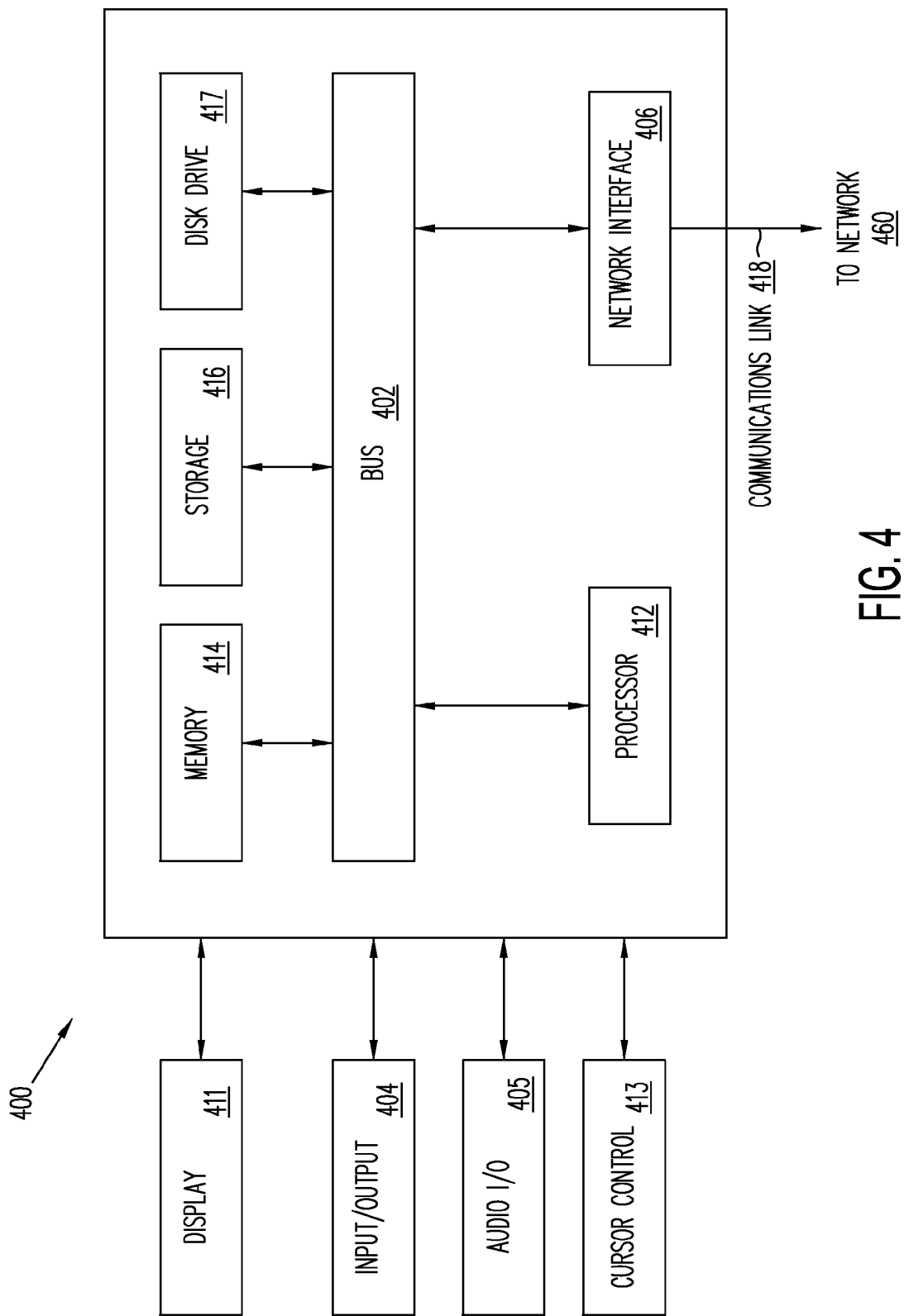
FIG. 4 is a block diagram of an example of a computer that is suitable for use in the location based shopping list system, in accordance with an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store. The store can be any place where a user can purchase a product.

As used herein, the term "product" can include any item or service. A product can be anything that can be sold.

As used herein, the term "merchant" can include any seller of products. The term merchant can include a store. The products can be sold from a store or in any other manner.

As described above, users can more conveniently determine which products should be purchase during a visit to a store. A list of previously purchased products can be used to remind the user of one or more products that should be purchased. The list can have other uses. For example, the list can remind the user that a product has recently been purchased and thus does not need to be purchase again soon.

Forgotten products and undesirable repeat visits to stores can be avoided. By avoiding such unnecessary repeat visits to stores gas is conserved, pollution is mitigated, and overall convenience is enhanced. Further, traffic congestion can be reduced and safety can be improved by reducing the number of cars on the road.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A payment processing system configured to process payments for purchases made by users, the payment processing system comprising:
    a non-transitory memory storing account information for a user, wherein the account information includes products previously purchased by the user via the payment processing system; and
    one or more hardware processors coupled to the non-transitory memory and configured to execute instructions to cause the payment processing system to perform operations comprising:
        receiving, from a mobile app installed on a user device of a user via an electronic communication network, a request for a shopping list, wherein the user device is associated with a cellular network;
        receiving, from the user device of the user via the electronic communication network, a location detected by a location detection device of the user device associated with the user;
        determining that the user is within a proximity from a present shopping location based on the location;
        responsive to location coordinates being inadequate to distinguish which shopping location corresponds to the location, accessing a database to identify, in real time, a record of a plurality of records that corresponds to statistical information associated with the user, wherein the statistical information includes shopping frequency at the present shopping location;
        using the statistical information regarding shopping frequency at the present shopping location to determine that the user is at the present shopping location;
        retrieving an identity and a price of at least one product previously purchased by the user and by another user linked to the user in a location-based shopping list system, wherein the at least one product was previously purchased at another shopping location different from the present shopping location and is available for purchase at the present shopping location; and
        communicating, via the electronic communication network, information about the identity and the price of the at least one product previously purchased at the another shopping location to the user device carried by the user for displaying to the user by the mobile app the shopping list comprising the identity and the price of the at least one product when the user is located at the present shopping location.

2. The payment processing system of claim 1, wherein the at least one product was previously purchased during a last visit by the user to the present shopping location.

3. The payment processing system of claim 1, wherein the at least one product was previously purchased during one or more previous visits by the user to the present shopping location.

4. The payment processing system of claim 1, wherein the present shopping location and the another shopping location are operated by a same merchant.

5. The payment processing system of claim 1, wherein the operations further comprise:
    retrieve an incentive associated with the at least one product offered at the another shopping location; and
    communicate the incentive offered at the another shopping location to the user.

6. The payment processing system of claim 1, wherein the another user is related to the user as a friend or a family member.

7. The payment processing system of claim 1, wherein the at least one product comprises a list of products previously purchased by the user or the another user at a plurality of other shopping locations.

8. A payment processing method for processing payments made via a payment processing system, the payment processing method comprising:
    receiving, by a computer system of a payment processing system from a mobile app installed on a user device of a user via an electronic communication network, a request for a shopping list;
    accessing, by the computer system, account information for the user, wherein the account information includes products previously purchased by the user;
    receiving, by the computer system from the user device of the user via the electronic communication network, a location detected by a location detection device of the user device associated with the user, wherein the user device is associated with a cellular network;

determining, electronically by the computer system, that the user is within a proximity from a present shopping location based on the location;

responsive to location coordinates being inadequate to distinguish which shopping location corresponds to the location, accessing a database to identify, in real time, a record of a plurality of records that corresponds to statistical information associated with the user, wherein the statistical information includes shopping frequency at the present shopping location;

using the statistical information regarding shopping frequency at the present shopping location to determine that the user is at the present shopping location;

retrieving, electronically by the computer system, an identity and a price of at least one product previously purchased by the user and by another user linked to the user in a location-based shopping list system, wherein the at least one product was previously purchased at another shopping location different from the present shopping location, and is available for purchase at the present shopping location; and communicating, electronically by the computer system via the electronic communication network, information about the identity and the price of the at least one product previously purchased at the another shopping location to the user device carried by the user for displaying to the user by the mobile app the shopping list comprising the identity and the price of the at least one product when the user is located at the present shopping location.

9. The payment processing method of claim 8, wherein the at least one product was previously purchased during a last visit by the user to the present shopping location.

10. The payment processing method of claim 8, wherein the at least one product was previously purchased during one or more previous visits by the user to the present shopping location.

11. The payment processing method of claim 8, wherein the present shopping location and the another shopping location are operated by a same merchant.

12. The payment processing method of claim 8, further comprising:
retrieving an incentive associated with the at least one product offered at the another shopping location; and
communicating the incentive offered at the another shopping location to the user.

13. The payment processing method of claim 8, wherein the another user is related to the user as a friend or a family member.

14. The payment processing method of claim 8, wherein the at least one product comprises a list of products previously purchased by the user or the another user at a plurality of other shopping locations.

15. A non-transitory machine-readable medium having stored thereon machine-readable instructions executable to cause a machine to perform operations comprising:
receiving, from a mobile app installed on a user device of a user via an electronic communication network, a request for a shopping list;
accessing account information for the user, wherein the account information includes products previously purchased by the user;
receiving, from the user device of the user via the electronic communication network, a location detected by a location detection device of the user device associated with the user, wherein the user device is associated with a cellular network;
determining that the user is within a proximity from a present shopping location based on the location;
responsive to location coordinates being inadequate to distinguish which shopping location corresponds to the location, accessing a database to identify, in real time, a record of a plurality of records that corresponds to statistical information associated with the user, wherein the statistical information includes shopping frequency at the present shopping location;
using the statistical information regarding shopping frequency at the present shopping location to determine that the user is at the present shopping location;
retrieving an identity and a price of at least one product previously purchased by the user and by another user linked to the user in a location-based shopping list system, wherein the at least one product was previously purchased at another shopping location different from the present shopping location and is available for purchase at the present shopping location; and
communicating, via the electronic communication network, information about the identity and the price of the at least one product previously purchased at the another shopping location to the user device carried by the user for displaying to the user by the mobile app the shopping list comprising the identity and the price of the at least one product when the user is at the present shopping location.

16. The non-transitory machine-readable medium of claim 15, wherein the at least one product was previously purchased during a last visit by the user to the present shopping location.

17. The non-transitory machine-readable medium of claim 15, wherein the at least one product was previously purchased during one or more previous visits by the user to the present shopping location.

18. The non-transitory machine-readable medium of claim 15, wherein the present shopping location and the another shopping location are operated by a same merchant.

19. The non-transitory machine-readable medium of claim 15, wherein the operations further comprise:
retrieving an incentive associated with the at least one product offered at the another shopping location; and
communicating the incentive offered at the another shopping location to the user.

20. The non-transitory machine-readable medium of claim 15, wherein the at least one product comprises one or more product previously purchased by the another user at the another shopping location.

* * * * *